(12) United States Patent
Fan et al.

(10) Patent No.: US 7,381,767 B2
(45) Date of Patent: Jun. 3, 2008

(54) ETHYLENE COPOLYMER MODIFIED POLYPROPYLENE AND SHAPED ARTICLES

(75) Inventors: Xiyun Serene Fan, Newark, DE (US); Hwee Tatz Thai, Singapore (SG)

(73) Assignee: E. I. du Pont de Nemours and Company, Wilmington, DE (US)

(*) Notice: Subject to any disclaimer, the term of this patent is extended or adjusted under 35 U.S.C. 154(b) by 335 days.

(21) Appl. No.: 11/222,077

(22) Filed: Sep. 8, 2005

(65) Prior Publication Data
US 2006/0052511 A1  Mar. 9, 2006

Related U.S. Application Data

(60) Provisional application No. 60/608,031, filed on Sep. 8, 2004.

(51) Int. Cl.
*C08L 53/00* (2006.01)
(52) U.S. Cl. .............. 524/505; 524/521; 524/522; 524/523; 525/208; 525/221; 525/222; 525/240
(58) Field of Classification Search ........... 525/208, 525/221, 222, 240; 524/505, 521, 522, 523
See application file for complete search history.

(56) References Cited

U.S. PATENT DOCUMENTS

| | | | |
|---|---|---|---|
| 3,433,573 A | 3/1969 | Holladay et al. | |
| 4,550,843 A | 11/1985 | Nolan | |
| 4,770,309 A | 9/1988 | Thompson | |
| 4,807,772 A | 2/1989 | Schloss | |
| 5,454,476 A | 10/1995 | King et al. | |
| 2003/0232931 A1* | 12/2003 | Chen et al. | 525/418 |
| 2007/0142534 A1* | 6/2007 | Moad et al. | 524/445 |

FOREIGN PATENT DOCUMENTS

| | | |
|---|---|---|
| EP | 0 080 274 B1 | 5/1986 |
| WO | WO 2003048434 A1 | 6/2003 |

OTHER PUBLICATIONS

Brody, H.; Orientation Suppression in Fibers Spun from Polymer Melt Blends; J. Appl. Polymer Science, 81, 2753-2768 (1986).
PCT International Search Report for International application No. PCT/US2005/031153, dated Jan. 17, 2006.

* cited by examiner

*Primary Examiner*—Peter D Mulcahy

(57) ABSTRACT

Disclosed are compositions and shaped articles comprising or produced from the compositions. The compositions can comprise (a) at least one polypropylene polymer and (b) at least one E/X/Y copolymer wherein E comprises ethylene; X is a monomer such as vinyl acetate and alkyl (meth)acrylic esters; and Y is one or more additional comonomers such as carbon monoxide; sulfur dioxide; acrylonitrile; maleic anhydride; maleic acid diesters; (meth)acrylic acid, maleic acid, maleic acid monoesters, itaconic acid, fumaric acid, fumaric acid monoester, and salts thereof; glycidyl acrylate, glycidyl methacrylate, and glycidyl vinyl ether in which, based on the E/X/Y copolymer, X is from 0 to 50 weight %, Y is from 0 to 35 weight % of said, X and Y cannot both be 0%, and E is the remainder.

20 Claims, No Drawings

ETHYLENE COPOLYMER MODIFIED POLYPROPYLENE AND SHAPED ARTICLES

This application claims priority to U.S. provisional application Ser. No. 60/608,031 filed Sep. 8, 2004, the entire disclosure of which is incorporated herein by reference.

This invention relates to compositions comprising polypropylene modified with ethylene copolymers such as ethylene/alkyl acrylate copolymers and shaped articles produced therefrom.

BACKGROUND ART

Polypropylene compositions with improved mechanical properties have been prepared by adding small amounts of additives to polypropylene. For example, WO 2003/048434 discloses a method for making polypropylene monofilaments by adding to the polypropylene 0.1 to 20% of an additive. EP0080274B1 discloses methods for making polypropylene melt-spun fibers by adding 0.1 to 10% of another polymer that is immiscible in a melt of the polypropylene (in particular, polyhexamethylene adipamide). Polypropylene has also been modified by the addition of small amounts of liquid crystal polymers, polyethylene, polyethylene glycol and nylon 66 (*Journal of Applied Polymer Science*, 1986, 31(8), 2753-68). Blends of polypropylene and ethylene/alkyl acrylate copolymers have been previously disclosed (see, e.g., U.S. Pat. No. 3,433,573).

Thermoplastic materials are commonly used to manufacture various shaped articles which may be utilized in applications such as automotive parts, food containers, signs, packaging materials and the like. Shaped articles comprising polypropylene (PP) homopolymer may be prepared from the molten polymeric material by a number of melt extrusion processes known in the art, such as injection molding, compression molding, blow molding, profile extrusion and the like.

Shaped articles may also be prepared by thermoforming processes, wherein a thermoplastic film or sheet is heated above its softening temperature and formed into a desired shape. This formed sheet of a film or laminate is usually referred to as a forming web. Various systems and devices are used in a thermoforming process, often accompanied by vacuum-assist and plug-assist components to provide the proper forming of the forming web into a predetermined shape. Thermoforming processes and systems are well known in the art.

Examples of molded articles comprising polypropylene include injection molded or compression molded caps or closures for containers. Containers having closures are well known and have a wide variety of uses. For example, they may contain medicines or pharmaceuticals. They may contain drinks, such as water, milk, carbonated or non-carbonated beverages, and the like, or wines or spirits (e.g. gin or whiskey). They may be used to contain foods. They may also be used to contain petroleum products, oil, or household preparations or chemicals such as hair care products, detergents, bleaches and the like. The present invention is applicable to all of these areas of use and many others besides. The function of a closure or cap is to adequately seal the contents of a container against leakage from or into the container. In many instances, the cap is designed for repeated removal and replacement as the consumer accesses the contents of the container.

Closures or caps for such containers are often prepared from thermoplastic compositions such as PP by injection molding or compression molding. PP caps have been disclosed, for example, in U.S. Pat. Nos. 4,550,843; 4,770,309; 4,807,772 and 5,454,476.

Typically polypropylene caps consist of a top and a depending skirt that close around the neck of the container. In some instances caps may comprise continuous or discontinuous threads that provide screw closures to the container and/or snap closures. They may also incorporate dispensing features, tamper-evidence features and child resistant features. Other decorative or functional features may also be present. They may also include combinations with other materials (e.g., caps having metal lid portions or portions utilizing plastic materials other than polypropylene). The PP caps may be linerless (see U.S. Pat. No. 4,770,309) or have a separate liner that is inserted or compression molded into the PP shell of the cap (see U.S. Pat. No. 4,807,772).

Polypropylene caps preferably have sufficient rigidity and strength to provide structural integrity to the closure during assembly and storage of the container while retaining sufficient flexibility to withstand stresses associated with high speed capping operations. Flexibility is also preferred for providing good sealing to the container such as in certain child resistant cap designs.

A problem with polypropylene caps is an unacceptable rate of fracture cracking. Thus, it is desirable to provide PP compositions and shaped articles produced therefrom, such as caps, with improved mechanical properties such as tensile breaking load, tenacity (tensile breaking stress) and elongation to break.

DISCLOSURE OF THE INVENTION

This invention provides a composition comprising, or produced from, (a) at least one polypropylene polymer selected from the group consisting of polypropylene homopolymers; random copolymers or block copolymers of polypropylene and ethylene; and random terpolymers or block terpolymers of polypropylene, ethylene and one other olefin; and (b) from 0.2 to 30 weight % of at least one E/X/Y copolymer wherein E comprises ethylene; X is a monomer selected from the group consisting of vinyl acetate and alkyl (meth)acrylic esters; and Y is one or more additional comonomers selected from the group consisting of carbon monoxide; sulfur dioxide; acrylonitrile; maleic anhydride; maleic acid diesters; (meth) acrylic acid, maleic acid, maleic acid monoesters, itaconic acid, fumaric acid, fumaric acid monoester, and salts thereof; glycidyl acrylate, glycidyl methacrylate, and glycidyl vinyl ether; wherein X is from 0 to 50 weight % of the E/X/Y copolymer, Y is from 0 to 35 weight % of the E/X/Y copolymer, wherein the weight % of X and Y cannot both be 0, and E comprises the remainder. The composition optionally comprises (c) from 0.01 to 40 weight % of at least one additional component such as fillers, delustrants, UV stabilizers, pigments, and other additives.

Also provided is a shaped article produced from the composition.

DETAILED DESCRIPTION OF THE INVENTION

"Copolymer" means polymers containing two or more different monomers. The terms "dipolymer" and "terpolymer" mean polymers containing only two and three different monomers respectively. The phrase "copolymer of various monomers" means a copolymer whose units are derived from the various monomers.

A preferred embodiment is a shaped article prepared from a composition comprising (a) at least one polypropylene polymer; and (b) from 0.1 to 3 or 0.2 to 3 weight % of at least one ethylene/alkyl acrylate copolymer. Alternatively, the amount of ethylene/alkyl acrylate copolymer is from 1 to 3 weight %; preferably from 0.2 to 1.5 weight %, alternatively from 1 to 1.5 weight %. Also preferably, the amount of ethylene/alkyl acrylate copolymer is from 0.2 to 0.5 weight %; notably from 0.2 to 1 weight %; or alternatively from greater than 0.1 to 0.5 weight %.

Polypropylene polymers include homopolymers, random copolymers, block copolymers, terpolymers of propylene, and combinations of two or more thereof. Copolymers of propylene include copolymers of propylene with other olefins such as ethylene, 1-butene, 2-butene and the various pentene isomers, etc. and preferably copolymers of propylene with ethylene. Terpolymers of propylene include copolymers of propylene with ethylene and one other olefin. Random copolymers, also known as statistical copolymers, are polymers in which the propylene and the comonomer(s) are randomly distributed throughout the polymeric chain in ratios corresponding to the feed ratio of the propylene to the comonomer(s). Block copolymers are made up of chain segments consisting of propylene homopolymer and of chain segments consisting of, for example, random copolymers of propylene and ethylene. The term "polypropylene" when used herein is used generically to refer to any or all of the polymers comprising propylene described above.

Polypropylene homopolymers or random copolymers can be manufactured by any known process. For example, polypropylene polymers can be prepared in the presence of Ziegler-Natta catalyst systems, based on organometallic compounds and on solids containing titanium trichloride.

Block copolymers can be manufactured similarly, except that propylene is generally first polymerized by itself in a first stage and propylene and additional comonomers such as ethylene are then polymerized, in a second stage, in the presence of the polymer obtained during the first. Each of these stages can be carried out, for example, in suspension in a hydrocarbon diluent, in suspension in liquid propylene, or else in gaseous phase, continuously or noncontinuously, in the same reactor or in separate reactors.

Additional information relating to block copolymers and to their manufacture may be found particularly in chapters 4.4 and 4.7 of the work "Block Copolymers" edited by D. C. Allport and W. H. Janes, published by Applied Science Publishers Ltd in 1973, which are incorporated by reference in the present description.

Ethylene copolymers used as polyester modifiers as described herein include ethylene/vinyl acetate dipolymers, ethylene/vinyl acetate terpolymers, ethylene/alkyl (meth) acrylate dipolymers, ethylene/alkyl (meth)acrylate terpolymers, functionalized ethylene copolymers, ethylene/acid copolymers, and salts thereof.

As disclosed above, these ethylene copolymers can be defined as E/X/Y copolymers wherein E comprises ethylene, X is a comonomer selected from the group consisting of vinyl acetate and alkyl (meth)acrylic esters; and Y is one or more additional comonomers.

The term "ethylene/vinyl acetate dipolymers" includes copolymers derived from the copolymerization of ethylene and vinyl acetate.

The term "ethylene/vinyl acetate terpolymers" includes copolymers derived from the copolymerization of ethylene, vinyl acetate and an additional comonomer.

The relative amount of the vinyl acetate comonomer incorporated into ethylene/vinyl acetate copolymers can, in principle, vary broadly from a few weight percent up to as high as 40 weight percent of the total copolymer or even higher.

The term "(meth)acrylic acid," and the abbreviation "(M) AA," means methacrylic acid and/or acrylic acid. Likewise, the terms "(meth)acrylate" and "alkyl (meth)acrylate" means alkyl esters of methacrylic acid and/or acrylic acid, preferably wherein the alkyl moiety contains from one to six carbon atoms. Examples of alkyl acrylates include methyl acrylate (abbreviated MA), ethyl acrylate (abbreviated EA) and butyl acrylate (abbreviated BA).

The term "ethylene/alkyl (meth)acrylate dipolymers" includes copolymers derived from the copolymerization of ethylene and an alkyl (meth)acrylate.

The term "ethylene/alkyl (meth)acrylate terpolymers" includes copolymers derived from the copolymerization of ethylene, an alkyl (meth)acrylate and an additional comonomer.

The term "ethylene/alkyl acrylate copolymers" includes copolymers of ethylene and alkyl acrylates wherein the alkyl moiety contains from one to six carbon atoms. Examples of alkyl acrylates include methyl acrylate, ethyl acrylate and butyl acrylate. "Ethylene/methyl acrylate (abbreviated EMA)" means a copolymer of ethylene (abbreviated E) and methyl acrylate (abbreviated MA). "Ethylene/ethyl acrylate (abbreviated EEA)" means a copolymer of ethylene (abbreviated E) and ethyl acrylate (abbreviated EA). "Ethylene/butyl acrylate (abbreviated EBA)" means a copolymer of ethylene (abbreviated E) and butylacrylate (abbreviated BA).

The relative amount of the alkyl acrylate comonomer incorporated into ethylene/alkyl acrylate copolymers can, in principle, vary broadly from a few weight percent up to as high as 40 weight percent of the total copolymer or even higher. Similarly, the choice of the alkyl group can, again in principle, vary from a simple methyl group up to a six-carbon atom alkyl group with or without significant branching. The relative amount and choice of the alkyl group present in the alkyl acrylate ester comonomer can be viewed as contributing to how and to what degree the resulting copolymer is to be viewed as a polar polymeric constituent in the thermoplastic composition.

Preferably, the alkyl group in the alkyl acrylate comonomer has from one to four carbon atoms and the alkyl acrylate comonomer has a concentration range of from 5 to 40 weight percent of the terpolymer, preferably from 10 to 35 weight %. Most preferably, the alkyl group in the alkyl acrylate comonomer is methyl.

In addition to the contribution of the X comonomer to the polarity of the polymeric composition, the relative amount and choice of the Y comonomer(s) present in the ethylene copolymer can be viewed as contributing to how and to what degree the resulting copolymer is to be viewed as a polar polymeric constituent in the thermoplastic composition. As disclosed above, the Y comonomer may also provide functionality to the ethylene copolymer (to form a functionalized ethylene copolymer) in addition to its contribution to the overall polarity of the copolymer.

Suitable as Y components in the E/X/Y copolymers useful in this invention are acrylic acid or methacrylic acid. Copolymers of an olefin such as ethylene and an unsaturated carboxylic acid, such as acrylic acid or methacrylic acid are, in the context of this invention, referred to as ethylene/acid copolymers. For example, "ethylene/(meth)acrylic acid (abbreviated E/(M)AA)" means a copolymer of ethylene (abbreviated E)/acrylic acid (abbreviated AA) and/or methacrylic acid (abbreviated MAA). Ethylene/acid copolymers useful in this invention include E/(M)AA dipolymers having from about 2 to about 30 weight % (M)AA. These copolymers can be defined in the context of this invention as an E/X/Y copolymer wherein the weight % of X is 0 and Y is acrylic acid or methacrylic acid with a weight % of from about 2 to about 30 weight %, the remainder being ethylene.

Ethylene/acid copolymers may also be terpolymers containing additional comonomers selected from alkyl (meth) acrylates. These acid terpolymers, when the α-olefin is ethylene, can be described as E/X/Y copolymers wherein E is ethylene, X is selected from the group consisting of $C_1$ to $C_6$ alkyl acrylate or methacrylate esters and Y is acrylic acid or methacrylic acid. X and Y can be present in a wide range of percentages, X typically up to about 50 weight percent of the terpolymer and Y typically up to about 35 weight percent (wt. %) of the polymer. These ethylene/acid terpolymers include, for example, ethylene/n-butyl (meth)acrylate/ (meth)acrylic acid terpolymers, ethylene/iso-butyl (meth) acrylate/(meth)acrylic acid terpolymers, ethylene/methyl (meth)acrylate/(meth)acrylic acid terpolymers, and ethylene/ethyl (meth)acrylate/(meth)acrylic acid terpolymers.

Ethylene/acid copolymers as described above may be at least partially neutralized into metal salts. At least one alkali metal, transition metal, or alkaline earth metal cation, such as lithium, sodium, potassium, magnesium, calcium, or zinc, or a combination of such cations, is used to neutralize some portion of the acidic groups in the copolymer resulting in a thermoplastic resin exhibiting enhanced properties. These neutralized acid copolymers are commonly referred to as ionomeric resins ("ionomers").

Ionomers useful in this invention include those prepared from E/(M)AA dipolymers having from about 2 to about 30 weight % (M)AA. These copolymers can be defined in the context of this invention as an E/X/Y copolymer wherein the weight % of X is 0 and Y is acrylic acid or methacrylic acid with a weight % of from about 2 to about 30 weight %, the remainder being ethylene, at least partially neutralized by at least one of the alkali metal, alkaline earth metal or transition metal cations. Cations are selected from the group consisting of lithium*, sodium*, potassium, magnesium*, calcium, barium, lead, tin, or zinc* (* indicates a preferred cation), or a combination of such cations.

Various ionomeric resins are sold by E. I. du Pont de Nemours and Company (DuPont), Wilmington, Del. under the trademark "Surlyn®" and by the Exxon Corporation under the trademark "Escor®" and the tradename "Iotek."

The term "functionalized ethylene copolymers" as used herein denotes copolymers of ethylene that incorporate reactive functional groups such as anhydrides and epoxides that can react with other components by, for example, covalent bonding.

Also suitable as Y components in the E/X/Y copolymers useful in this invention are maleic diesters or monoesters (maleic half-esters) including esters of $C_1$-$C_4$ alcohols, such as, for example, methyl, ethyl, n-propyl, isopropyl, and n-butyl alcohols. Preferably the ethylene/maleate copolymer includes maleic anhydride. Also preferably the ethylene/ maleate copolymer includes maleic acid half-esters.

Maleic anhydride-grafted ethylene copolymers (maleated polyethylene) are those wherein ethylene copolymers such as polyethylenes are treated with maleic anhydride and are known in the art as compatibilizers. Grafted E/X/Y copolymers as described herein include copolymers wherein a portion of the E component comprises an α-olefin other than ethylene, such as butene, hexene or octane, to modify the density of the copolymer. An example of a maleic anhydride modified linear high-density polyethylene is a product sold under the trademark Polybond® 3009 available from Crompton Corporation. Similar maleated polyolefins are sold under the trademark Fusabond® available from DuPont. Preferred grafted E/X/Y copolymers are those wherein maleic anhydride is incorporated in a range from about 0.3 to about 2 weight %.

Ethylene copolymers that include reactive functional groups such as maleic anhydride can also be readily obtained by a high-pressure free radical process. A high-pressure process suitable for use in preparing such copolymers is described, for example, in U.S. Pat. No. 4,351,931. This eliminates the secondary process step of grafting traditionally used to create maleic anhydride-functionalized polymers. In addition, it is easier to obtain maleic anhydride incorporation to levels greater than 2 weight % using this process than by grafting. Preferred copolymers prepared from ethylene and a functional comonomer prepared by this process are those wherein the copolymer comprises from about 3 weight % to about 15 weight % of the functional comonomer. Of note are copolymers such as ethylene/ maleic anhydride (E/MAH) or ethylene/ethyl hydrogen maleate (also known as ethylene/maleic acid monoester, or E/MAME) copolymer, which are synthesized directly in high-pressure autoclaves.

Also suitable as Y components in the E/X/Y terpolymers useful in this invention are epoxy-functionalized ethylene comonomers such as glycidyl acrylate, glycidyl methacrylate, or glycidyl vinyl ether (i.e. comonomers containing moieties derived from 2,3-epoxy-1-propanol).

Preferred epoxy-functionalized copolymers useful in this invention may be represented by the formula: E/X/Y, where E is the copolymer unit —$(CH_2CH_2)$— derived from ethylene; X is the copolymer unit —$(CH_2CR^1R^2)$—, where $R^1$ is hydrogen or methyl, and $R^2$ is carboalkoxy of 1 to 10 carbon atoms (X for example is derived from alkyl acrylates, alkyl methacrylates) or acetyloxy; and Y is the copolymer unit —$(CH_2CR^3R^4)$—, where $R^3$ is hydrogen or methyl and $R^4$ is carboglycidoxy or glycidoxy (Y for example is derived from glycidyl acrylate, glycidyl methacrylate, or glycidyl vinyl ether).

Preferred for this embodiment of the invention, useful E/X/Y copolymers are those wherein X is 5 to 50 weight % of said E/X/Y copolymer, Y is 0.3 to 15 weight % of said E/X/Y copolymer, E being the remainder.

More preferably, the comonomer containing the epoxy moiety (e.g., glycidyl acrylate or glycidyl methacrylate) is about 0.3 (or about 0.5) weight % to about 8 (or about 10 or about 12) weight % and the alkyl acrylate is from about 5 to about 40 (preferably about 20 to about 40 or about 25 to about 35) weight % of the total weight of the epoxy-functionalized ethylene copolymer.

Of note are copolymers such as ethylene/methyl acrylate/ glycidyl methacrylate (E/MA/GMA), ethylene/ethyl acrylate/glycidyl methacrylate (E/EA/GMA) and ethylene/n-butyl acrylate/glycidyl methacrylate (E/n-BA/GMA).

It is also preferred that the epoxide-containing monomers, and more preferably the glycidyl-containing monomers, are incorporated into the reactant copolymer by the concurrent reaction of monomers and are not grafted onto a polymer by graft polymerization.

Also suitable as Y components in the E/X/Y copolymers useful in this invention are comonomers selected from the group consisting of carbon monoxide, sulfur dioxide and acrylonitrile. Of note are terpolymers such as ethylene/methyl acrylate/carbon monoxide (E/MA/CO), ethylene/ethyl acrylate/carbon monoxide (E/EA/CO) and ethylene/n-butyl acrylate/carbon monoxide (E/n-BA/CO), and ethylene/vinyl acetate/carbon monoxide (E/VA/CO).

Ethylene/alkyl acrylate copolymers can be prepared by processes well known in the polymer art using either autoclave or tubular reactors. The copolymerization can be run as a continuous process in an autoclave: ethylene, the alkyl acrylate, and optionally a solvent such as methanol (see U.S. Pat. No. 5,028,674) are fed continuously into a stirred autoclave of the type disclosed in U.S. Pat. No. 2,897,183, together with an initiator. The rate of addition will depend on variables such as the polymerization temperature, pressure, alkyl acrylate monomer employed, and concentration of the monomer in the reaction mixture needed to achieve the target composition of the copolymer. In some cases, it may be desirable to use a telogen such as propane, to control the molecular weight. The reaction mixture is continuously removed from the autoclave. After the reaction mixture leaves a reaction vessel, the copolymer is separated from the unreacted monomers and solvent (if solvent was used) by conventional means, e.g., vaporizing the nonpolymerized materials and solvent under reduced pressure and at an elevated temperature.

Tubular reactor produced ethylene/alkyl acrylate copolymer can be distinguished from the more conventional autoclave produced ethylene/alkyl acrylate as generally known in the art. Thus the term or phrase "tubular reactor produced" ethylene/alkyl acrylate copolymer, for purposes of this invention, denotes an ethylene copolymer produced at high pressure and elevated temperature in a tubular reactor or the like, wherein the inherent consequences of dissimilar reaction kinetics for the respective ethylene and alkyl acrylate comonomers is alleviated or partially compensated by the intentional introduction of the monomers along the reaction flow path within the tubular reactor. As generally recognized in the art, such a tubular reactor copolymerization technique produces a copolymer having a greater relative degree of heterogeneity along the polymer backbone (a more blocky distribution of comonomers), tends to reduce the presence of long chain branching, and produces a copolymer characterized by a higher melting point than one produced at the same comonomer ratio in a high pressure stirred autoclave reactor. Tubular reactor produced ethylene/alkyl acrylate copolymers are generally stiffer and more elastic than autoclave produced ethylene/alkyl acrylate copolymers. Tubular reactor produced ethylene/alkyl acrylate copolymers of this nature are commercially available from DuPont.

The actual manufacturing of the tubular reactor ethylene/alkyl acrylate copolymers as previously stated is preferably in a high pressure, tubular reactor at elevated temperature with additional introduction of reactant comonomer along the tube and not merely manufactured in a stirred high-temperature and high-pressure autoclave type reactor. However, similar ethylene/alkyl acrylate copolymeric material can be produced in a series of autoclave reactors wherein comonomer replacement is achieved by multiple zone introduction of reactant comonomer as taught in U.S. Pat. Nos. 3,350,372; 3,756,996; and 5,532,066, and as such these high melting point materials may be considered equivalent for purposes of this invention. The entire disclosures of these patents are incorporated herein by reference.

To further illustrate and characterize the tubular reactor produced ethylene/alkyl acrylate copolymer relative to conventional autoclave produced copolymer, the following list of commercially available ethylene/methyl acrylate copolymers with associated melting point data show that tubular EMA resins have considerably higher melting points versus autoclave EMA's due to a very different MA distribution along polymer chains:

| Autoclave produced copolymers |
|---|
| EMA-A1 (21.5 wt % MA), mp = 76° C. |
| EMA-A2 (24 wt % MA), mp = 69° C. |
| EMA-A3 (20 wt % MA), mp = 80° C. |
| EMA-A4 (24 wt % MA), mp = 73° C. |
| Tubular reactor produced copolymers |
| EMA-T1 (25 wt % MA), mp = 88° C. |
| EMA-T2 (20 wt % MA), mp = 95° C. |

For additional discussion regarding the differences between tubular reactor produced and autoclave produced ethylene/alkyl acrylate copolymers, see Richard T. Chou, Mimi Y. Keating and Lester J. Hughes, "High Flexibility EMA made from High Pressure Tubular Process", Annual Technical Conference—Society of Plastics Engineers (2002), 60th(Vol. 2), 1832-1836. CODEN: ACPED4 ISSN: 0272-5223; AN 2002:572809; CAPLUS.

Ethylene/alkyl acrylate copolymers suitable for use in this invention are available from DuPont. See Table A for specific examples of tubular reactor produced ethylene/alkyl acrylate copolymers available from DuPont.

TABLE A

| Ethylene Alkyl Acrylate Copolymer | Alkyl acrylate wt % | Melt Flow (g/10 min) |
|---|---|---|
| EMA | 25 | 0.4 |
| EMA | 25 | 0.6 |
| EMA | 9 | 2 |
| EMA | 14 | 2 |
| EMA | 18 | 2 |
| EMA | 24 | 2 |
| EMA | 9 | 6 |
| EMA | 20 | 8 |
| EMA | 13 | 9 |
| EMA | 30 | 3 |
| EEA | 12 | 1 |
| EEA | 16 | 1 |
| EEA | 15 | 6 |
| EEA | 15 | 7 |
| EBA | 7 | 1.1 |
| EBA | 7 | 1.1 |
| EBA | 17 | 1.5 |
| EBA | 17 | 1.8 |
| EBA | 27 | 4 |
| EBA | 17 | 7 |
| EBA | 35 | 1 |

The ethylene/alkyl acrylate copolymers useful in the present invention can vary significantly in molecular weight as witnessed by EMA having a melt index numerically in terms of a fraction up to about ten. The specific selection of the grade of ethylene/alkyl acrylate copolymer component (s) to be used to modify polypropylene may be influenced by balancing factors such as melt indices of the modifier and the polypropylene contemplated. Other factors to be considered in the selection of the ethylene/alkyl acrylate copolymer include increased elastic recovery associated with higher relative molecular weight copolymer (such as an E/25 weight % MA with a 0.7 MI) and the pragmatic ability to more easily blend with fillers (see below) with a relatively lower molecular copolymer (such as an E/20 weight % MA with an 8 MI (melt index)).

Compositions of ethylene/alkyl acrylate copolymers and polypropylene useful in this invention may be prepared by dry blending, pellet blending, melt blending, by extruding a mixture of the various constituents, and other mixing processes known in the art.

The compositions useful in this invention may optionally further comprise fillers such as calcium carbonate ($CaCO_3$), in quantities that may be up to 30 to 40 weight %, of a molding composition. For example, from 0.01 to 20 weight %, from 0.1 to 15 weight %, from about 2 to about 10 weight % $CaCO_3$ may be present in some shaped articles. The ethylene copolymers as described herein provide enhanced compatibility between the polypropylene base resin and optional filler. The enhanced compatibility may provide reduced tendency of "dusting" caused by separation of the filler and the polypropylene resin, lower $CaCO_3$ particulates in the air during processing operations, and reduced wear on molding or processing equipment. Use of ethylene copolymer modifiers as described herein may also provide for higher filler loading.

The compositions useful in this invention may optionally further comprise other additives such as delustrants such as titanium dioxide ($TiO_2$), UV stabilizers, pigments, etc. These additives are well known in the art of polypropylene shaped articles. These conventional ingredients may be present in the compositions according to this invention, from 0.01 to 20 weight %, preferably from 0.1 to 15 weight %.

The optional incorporation of such conventional ingredients into a composition comprising polypropylene modified with an ethylene copolymer can be carried out by any known process. This incorporation can be carried out, for example, by dry blending, by extruding a mixture of the various constituents, by the conventional masterbatch technique, or the like. A typical masterbatch may comprise from 75 to 90 weight % of $CaCO_3$. Of note is the use of a masterbatch comprising $CaCO_3$ and the ethylene/alkyl acrylate copolymer modifier.

As disclosed above, the shaped articles of this invention can be produced from a composition disclosed above. Shaped articles of this invention can be made by virtually any method of extrusion processing or thermoforming known to those skilled in this art. For example, a melt extrusion process such as injection molding, compression molding, blow molding and profile extrusion can be used. As such, the articles can be typically injection molded, compression molded, blow molded, profile extruded or the like. In addition, the shaped articles may comprise layers of polymeric material other than the modified polypropylene. Various additives as generally practiced in the art can be present in the respective layers including the presence of tie layers and the like, provided their presence does not substantially alter the properties of the article. Thus, it is contemplated that various additives such as antioxidants and thermal stabilizers, ultraviolet (UV) light stabilizers, pigments and dyes, fillers, delustrants, anti-slip agents, plasticizers, other processing aids, and the like may be employed.

In an embodiment, this invention provides a molded article such as a cap prepared from the composition disclosed above. Another embodiment is tubing prepared from a composition described above by profile extrusion.

Preferred shaped articles of this invention include shaped articles prepared from a composition comprising (a) at least one polypropylene polymer; and (b) from 0.2 to 30 weight % (alternatively from 1 to 30 weight %) of at least one ethylene/alkyl acrylate copolymer, including the following preferred articles.

Preferred 1. The article wherein said alkyl acrylate is present in said ethylene/alkyl acrylate copolymer in a range from about 5 to about 40 weight %.

Preferred 2. The article of Preferred 1 wherein said alkyl acrylate is present in said ethylene/alkyl acrylate copolymer in a range from about 10 to about 35 weight %.

Preferred 3. The article of Preferred 2 wherein said alkyl acrylate is selected from the group consisting of methyl acrylate, ethyl acrylate and butyl acrylate.

Preferred 4. The article of Preferred 3 wherein said alkyl acrylate is methyl acrylate.

Preferred 5. The article of any of Preferred 1 through Preferred 4 wherein component (b) is present in an amount from 0.2 to 15 weight % (alternatively from 1 to 15 weight %).

Preferred 6. The article of Preferred 5 wherein component (b) is present in an amount from 0.2 to 5 weight %.

Preferred 7. The article of Preferred 6 wherein component (b) is present in an amount from 0.2 to 1 weight %.

Preferred 8. The article of Preferred 6 wherein component (b) is present in an amount from greater than 1 to 5 weight %.

Preferred 9. The article of any of Preferred 1 through Preferred 8 further comprising
  (c) from 0.01 to 40 weight % of at least one additional component selected from the group consisting of fillers, delustrants, UV stabilizers, pigments and other additives.

Preferred 10. The article of Preferred 8 wherein component (c) is present in an amount between 0.1 and 15 weight %.

Preferred 11. The article of any of Preferred 1 through Preferred 9 wherein said composition comprises a tubular reactor produced ethylene/alkyl acrylate copolymer.

Typically, a manufacturing facility for preparing polypropylene shaped articles will have a limited ability to modify equipment and processing conditions. Therefore, the ethylene/alkyl acrylate modification of the polypropylene resin of this invention can provide significant improvement in mechanical properties of the articles prepared therefrom.

As disclosed above, a particular shaped article of this invention can be a molded cap or closure. Caps may be compression molded or injection molded. Such caps may be used to close and seal a wide variety of containers for a wide variety of products including: beverages, including carbonated soft drinks and pasteurized beverages such as beer; foods, especially those where container sealing performance is critical, including oxygen sensitive ones such as mayonnaise, peanut butter and salad oil, and including corrosive ones such as vinegar, lemon juice; and household chemicals, including bleaches, detergents, personal hygiene products, medicaments, drugs, cosmetics, petroleum products, and other products requiring the highest integrity seal and reseal under the widest range of distribution and use conditions.

Cap sizes may typically range from under about 1 mm to about 50 mm or 20 mm to 120 mm and bottle and/or jar sizes may range from under 2-ounce to 128-ounce capacity or larger. Larger capacity containers such as drums or kegs are also suitable for the practice of the invention as are smaller vials and other containers.

Although the shaped articles of present invention are described herein exemplified by caps as a preferred embodiment, other shaped articles are envisioned to benefit from the same improved mechanical properties such as tensile breaking load, tenacity (tensile breaking stress) and elongation to break. Injection molded hollow articles suitable for use as bottle preforms are further examples of molded articles of this invention.

Examples of blow molded articles include containers such as blown bottles. For example, in the bottle and container industry, the blow molding of injection molded polypropylene preforms has gained wide acceptance.

The bottles of this invention can be useful for packaging liquids such as milk and other dairy products. Other liquids that may be packaged in bottles of this invention include edible oils, syrups, sauces, purees such as baby foods, and pharmaceuticals. Motor oil, fuels such as gasoline, soaps, detergents, agrochemical products, and the like may also be packaged in bottles of this invention. Powders, granules and other flowable solids may also be packaged in bottles of this invention.

Although containers are generally described herein as bottles, other containers such as vials, jars, drums and fuel tanks may be prepared as described herein from the compositions and articles of this invention.

Another example of shaped article is a profile. Profiles are defined by having a particular shape and by their process of manufacture known as profile extrusion. Profiles are not film or sheeting, and thus the process for making profiles does not include the use of calendering or chill rolls. Profiles are also not prepared by injection molding processes. Profiles can be fabricated by melt extrusion processes that begin by extruding a thermoplastic melt through an orifice of a die forming an extrudate capable of maintaining a desired shape. The extrudate is typically drawn into its final dimensions while maintaining the desired shape and then quenched in air or a water bath to set the shape, thereby producing a profile. In the formation of simple profiles, the extrudate preferably maintains shape without any structural assistance. With extremely complex shapes, support means are often used to assist in shape retention.

A common shape of a profile is tubing. Tubing assemblies for the transport of liquids and vapors are well known in the art. In automotive applications such as fuel lines, air brake lines, hydraulic fluid lines and the like, tubing assemblies are exposed to a variety of deleterious and harmful conditions. The tubing is in nearly constant contact with automotive fluids and additives. Also, there are external environmental factors such as stone impact and corrosive media (such as salt) to consider. Furthermore, temperatures often rise to extremely high levels, and in cold climates, there is exposure to extremely low temperatures as well.

Tubing is also used for fluid transfer in medical applications or in transferring fluids such as beverages. These applications require good moisture barrier properties, chemical resistance, toughness and flexibility.

Shaped articles can also be prepared by thermoforming processes. Thermoformed articles typically have a shape in which a sheet of material shape forms a concave surface such as a tray, cup, can, bucket, tub, box or bowl. Typically, a flat sheet is heated, for example by a 315° C. black-body radiator from above and below the sheet during a 30 to 40-second dwell time, during which time the surface temperature of the sheet may rise toward the nominal forming temperature of polypropylene of 165° C. At the end of the heat-cycle the sheet is immediately positioned over an unheated, optionally cooled cavity mold and clamped to the mold perimeter. Vacuum from within the mold during a short period (e.g. two seconds) draws the sheet into the mold. After a cooling period the thermoformed article is ejected from the mold. Alternatively, a plug may force the softened sheet into the cavity mold. Either method provides an article in which the sheet is stretched or drawn into a shape having a thinner cross-section and a greater surface area than the sheet had originally.

Thermoformed articles as described above are often used as containers for packaging various consumer goods. Other articles, such as toys, panels, furniture and automotive parts may also be prepared similarly.

While the invention has been particularly shown and described with reference to the preferred embodiments thereof, it will be understood by those skilled in the art that various changes in form and details may be made without departing from the spirit and scope of the invention.

The following Examples are merely illustrative, and are not to be construed as limiting the scope of the invention described and/or claimed herein.

EXAMPLE A

Materials Used
PP-1: Polypropylene homopolymer with MI of 2.1 g/10 min (ASTM D-1238, 230° C. using a 2.16 Kg mass).
PP-2: Polypropylene copolymer with MI of 8.0.
EMA-1: Ethylene/alkyl acrylate copolymer with 20 weight % methyl acrylate with MI of 8 g/10 min (ASTM D-1238, 190° C. using a 2.16 Kg mass).
Titanium dioxide ($TiO_2$) as white colorant.
Compositions:
Comparative Example C1: PP-1 (99.2%)+$TiO_2$ (0.8%)
Example 2: PP-1 (98.2%)+$TiO_2$ (0.8%)+EMA-1 (1%)
Example 3: PP-1 (49.1%)+PP-2 (49.1%)+$TiO_2$ (0.8%)+ EMA-1 (1%)
Example 4: PP-1 (97.2%)+$TiO_2$ (0.8%)+EMA-1 (2%)
Processing Conditions
The EMA-1 modifier was dry blended with the PP resin(s) and the $TiO_2$ colorant master batch in a dry mixer. The mixture was then fed into the hopper of a Sacmi cap-making machine, extruded and compression-molded into caps having a standard design incorporating threads.
Extrusion temperature: 200° C.
Run speed: 500 caps per minute.

After being molded, the caps are belt-conveyed to a capping machine and screwed onto bottles according to standard procedures well known in the art. During these operations, non-modified PP caps exhibit a tendency to crack. The example caps were fitted to bottles and the rate of cracked caps was observed and reported in Table 1.

TABLE 1

| Example | Composition | Cap Crack Rate |
| --- | --- | --- |
| C1 | C1 | The cracking rate was 5% and higher |
| 2 | 2 | No cracking was observed during tests |
| 3 | 3 | No cracking was observed during tests |
| 4 | 4 | No cracking was observed during tests[1] |

[1]The tamper-evident band did not break when the cap was unscrewed to open the bottle.

Table 1 shows that incorporating 1% (compositions 2 and 3) or 2% (composition 4) of EMA, the cap crack rate reduced from over 5% to zero during the tests. Not shown in the table is that comparable results were obtained by incorporating 0.2 weight % to 5 weight % of EMA resin (for example EMA-1) into the PP formulation. Of particular note are PP compositions comprising from 0.2 weight % to 1 weight % of EMA. Higher levels (i.e. from greater than 1 weight % to 30 weight %) of EMA provide further increased elongation.

Furthermore, the improvement in mechanical properties over unmodified PP can be adjusted by varying the amount of ethylene/alkyl acrylate copolymer modifier. In some applications, such as caps, it is desirable to have an improvement in tensile properties that provides reduced cracking during processing conditions but still allows for appropriate failure (such as cleavage of tamper-evident bands) under suitable conditions. Thus, PP compositions comprising from 0.2 weight % to 1 weight % of ethylene/alkyl acrylate modifier are particularly suitable for preparing screw-caps.

These trial results confirmed that the addition of from 0.2 weight % to 30 weight % of ethylene/alkyl acrylate copolymer in the PP improved the mechanical properties such as tensile breaking load, elongation at break and tenacity of PP shaped objects.

EXAMPLE B

Material Used
PP-1: Marlex® HNZ-020 Homopolymer PP; MFR 2.3 g/10 min (ASTM D-1238, at 230° C., 2.16 kg); Density 0.907 g/cc,
EMA-1: Ethylene/alkyl acrylate copolymer with 20% methyl acrylate with MI of 8 g/10 min (ASTM D-1238, at 190° C., 2.16 kg), and
EMA-2: Ethylene/alkyl acrylate copolymer with 24% methyl acrylate with MI of 2 g/10 min (ASTM D-1238, at 190° C., 2.16 kg).
Compositions
PP-2+EMA-1 (0, 1, 2, 3, 4, 5% respectively)
PP-2+EMA-2 (0, 1, 2, 3, 4, 5% respectively)
Compounding Conditions
EMA-1 and EMA-2 were melt blended with PP-2 respectively using a twin screw extruder. The mixture was then fed into the hopper of an injection molding machine to mold sample bars for mechanical testing and thermal analyses.
1). The twin screw compounding conditions:
Melt temperature: 220° C. to 230° C., screw speed: 200 rpm, through-put: 30 lb/hr.
2). The injection molding conditions:
Melt temperature: 227° C., mold temperature: 32° C.
Property Testing Methods:
1). Notched Izod Impact Strength ASTM D256, tested at 23° C.
2). Dynamic Mechanical Analysis
Flex bar ⅛"×½" was fixed in 20-mm dual cantilever clamps in TA Instruments 2980 DMA in 8 in-lb torque force. A slow heating program of 2° C./min was set up at 10 μm oscillating amplitude and multi frequencies (1, 3, 5,10, 20, 50 Hz) from −140° C. to 140° C.
3). DSC thermal analysis
Temperature range from 0° C. to 210° C. at 10 C/min ramp rate.

Adding a small amount of EMA modifiers into the PP (Marlex) resin increased the impact strength. Table 2 shows that the Notched IZOD impact strength increased with increasing the EMA modifier concentration. The impact strength increased about 100% at around 3% modifier level where the strength peaked out. Similar improvement was seen with both EMA-1 and EMA-2 modifiers.

Another evidence of toughness improvement was seen from the DMA test. The activation energy of both glass transition ($\beta$) and $\alpha$-transition (transition in the imperfect area of the crystalline phase) decreased with the addition of the EMA-1 modifier. Table 3 shows the activation energy of glass transition dropped from 100 kcal/mole to 84 kcal/mole at 3% EMA-1; and the activation energy of $\alpha$-transition dropped from 43 kcal/mole to 29 kcal/mole at 3% EMA-1. The reduction in activation energy indicated that the dispersed EMA polymer chains in the PP matrix increased the PP polymer chain segments' mobility in the transition temperature range, which effectively absorbed external impact force and made the product tougher.

The DSC Results show that the freeze temperature of the PP control sample decreased after incorporating the EMA modifiers into the PP. Table 4 shows that the freeze temperature of the compound with 1% EMA-1 modifier dropped about 2° C. to 3° C. Table 5 shows the similar effect with EMA-2 modifier. The decrease in crystallization temperature could lead to a more complete crystallization and allow a lower injection molding processing temperature to be used, thereby positively affecting compound's mechanical properties, reducing molding cycle time, and increasing the productivity.

TABLE 2

Notched Izod Impact Strength of PP Modified with EMA Modifiers

| Modifier % | PP Control | 1 | 2 | 3 | 4 | 5 |
|---|---|---|---|---|---|---|
| PP/EMA-1 (J/m) | 49.3 | 85.9 | 80.0 | 104.4 | 104.9 | 104.9 |
| PP/EMA-2 (J/m) | 49.3 | 73.7 | 85.9 | 92.8 | 89.6 | 88.0 |

TABLE 3

Activation Energy of PP Modified with EMA-1

| Polymer | PP | PP/1% EMA | PP/3% EMA | PP/5% EMA |
|---|---|---|---|---|
| Tg (Glass Transition, $\beta$) (° C.) @ tan $\delta$ 1 Hz | 10.4 | 10.4 | 9.9 | 9.4 |
| Activation Energy of $\beta$ relaxation (kcal/mole) | 100 | 98 | 84 | 80 |
| T$\alpha$ (° C.) @ tan $\delta$ 1 Hz | 71 | 69 | 67 | 71 |
| Activation Energy of $\alpha$ relaxation (kcal/mole) | 43 | 33 | 29 | 36 |

TABLE 4

Melting and Freezing Temperatures of PP Modified with EMA-1

| | PP Control | PP/1% EMA-1 | PP/5% EMA-1 |
|---|---|---|---|
| Tm (° C.) | 162.3 | 163.3 | 162.7 |
| (J/g) | 107.4 | 101.4 | 97.7 |
| Tf (° C.) | 119.2 | 115.8 | 116.7 |
| (J/g) | 105.3 | 98.8 | 98.0 |

TABLE 5

Melting and Freezing Temperatures of PP Modified with EMA-2

| | PP Control | PP/1% EMA-2 | PP/5% EMA-2 |
|---|---|---|---|
| Tm (° C.) | 162.3 | 162.5 | 162.8 |
| (J/g) | 107.4 | 104.4 | 98.1 |
| Tf (° C.) | 119.2 | 116.9 | 116.0 |
| (J/g) | 105.3 | 102.3 | 96.8 |

The invention claimed is:

1. A shaped article comprising or produced from a composition which comprises or is produced from at least one polypropylene and 0.2 to 3 weight % of at least one E/X/Y copolymer wherein the polypropylene includes polypropylene homopolymer; random copolymers or block copolymers of polypropylene and ethylene; and random terpolymers or block terpolymers of polypropylene, ethylene and one other olefin; or combinations of two or more there of; and E comprises repeat units derived from ethylene; X derives from a monomer including vinyl acetate, alkyl (meth) acrylic ester, or combinations thereof; and Y derives from one or more additional comonomers including carbon monoxide; sulfur dioxide, acrylonitrile, maleic anhydride, maleic acid diester, (meth)acrylic acid, maleic acid, maleic acid monoester, itaconic acid, itaconic acid monoester, fumaric acid, fumaric acid monoester, a salt of any of these acids or esters, glycidyl acrylate, glycidyl methacrylate, glycidyl vinyl ether, or combinations of two or more thereof; X is from 0 to 50 weight % of the E/X/Y copolymer; Y is from 0 to 35 weight % of the E/X/Y copolymer; the weight % of X and Y cannot both be 0; and E is the remainder.

2. The article of claim 1 wherein the composition comprises or is produced from
   (a) at least one polypropylene polymer; and
   (b) 0.2 to 3 weight % of at least one ethylene/alkyl acrylate copolymer.

3. The article of claim 2 wherein the alkyl acrylate is present in said ethylene/alkyl acrylate copolymer in the range from about 5 to about 40 weight % or from about 10 to about 35 weight %.

4. The article of claim 2 wherein said alkyl acrylate is selected from the group consisting of methyl acrylate, ethyl acrylate, and butyl acrylate, and combinations of two or more thereof.

5. The article of claim 3 wherein said alkyl acrylate is methyl acrylate.

6. The article of claim 3 wherein component (b) is present in an amount of from 0.2 to 1.5 weight %.

7. The article of claim 5 wherein component (b) is present in an amount from 0.2 to 0.5 weight %, or from 0.2 to 1 weight %, or from 0.1 to 0.5 weight %.

8. The article of claim 1 wherein the composition comprises or is produced from additionally (c) from 0.01 to 40 weight % of at least one additional component selected from the group consisting of fillers, delustrants, UV stabilizers, pigments and other additives.

9. The article of claim 8 wherein the alkyl acrylate is methyl acrylate.

10. The article of claim 3 wherein the composition comprises a tubular reactor produced ethylene/alkyl acrylate copolymer.

11. The article of claim 6 wherein the composition comprises a tubular reactor produced ethylene/alkyl acrylate copolymer.

12. The article of claim 9 wherein the composition comprises a tubular reactor produced ethylene/alkyl acrylate copolymer.

13. The article of claim 1 being a molded cap and is optionally produced by thermoforming.

14. The article of claim 3 being a molded cap and is optionally produced by thermoforming.

15. The article of claim 6 being a molded cap and is optionally produced by thermoforming.

16. The article of claim 12 being a molded cap and is optionally produced by thermoforming.

17. The article of claim 14 wherein the article is produced by a melt extrusion process including injection molding, compression molding, blow molding, or profile extrusion.

18. The article of claim 16 wherein the article is produced by a melt extrusion process including injection molding, compression molding, blow molding, or profile extrusion.

19. The article of claim 17 wherein the article is prepared by profile extrusion and optionally includes tubing.

20. The article of claim 18 wherein the article is prepared by profile extrusion and optionally includes tubing.

* * * * *